United States Patent
Sébire et al.

(10) Patent No.: US 12,408,038 B2
(45) Date of Patent: Sep. 2, 2025

(54) PARTIAL INTEGRITY PROTECTION IN TELECOMMUNICATION SYSTEMS

(71) Applicant: NOKIA TECHNOLOGIES OY, Espoo (FI)

(72) Inventors: Benoist Sébire, Tokyo (JP); Samuli Turtinen, Ii (FI); Chunli Wu, Beijing (CN); Suresh Nair, Whippany, NJ (US)

(73) Assignee: Nokia Technologies Oy, Espoo (FI)

( * ) Notice: Subject to any disclaimer, the term of this patent is extended or adjusted under 35 U.S.C. 154(b) by 367 days.

(21) Appl. No.: 17/997,910

(22) PCT Filed: May 14, 2020

(86) PCT No.: PCT/CN2020/090350
§ 371 (c)(1),
(2) Date: Nov. 3, 2022

(87) PCT Pub. No.: WO2021/226960
PCT Pub. Date: Nov. 18, 2021

(65) Prior Publication Data
US 2023/0232234 A1    Jul. 20, 2023

(51) Int. Cl.
*H04W 12/106* (2021.01)
*H04W 8/24* (2009.01)

(52) U.S. Cl.
CPC ........... *H04W 12/106* (2021.01); *H04W 8/24* (2013.01)

(58) Field of Classification Search
CPC .... H04L 63/123; H04W 12/106; H04W 8/24; G06F 21/64
See application file for complete search history.

(56) References Cited

U.S. PATENT DOCUMENTS

| | | | | |
|---|---|---|---|---|
| 2020/0092727 A1* | 3/2020 | Basu Mallick | ......... | H04W 8/22 |
| 2021/0297861 A1* | 9/2021 | Nakarmi | ............... | H04W 12/03 |
| 2022/0345296 A1* | 10/2022 | Wu | ........................ | H04W 12/04 |

FOREIGN PATENT DOCUMENTS

| | | |
|---|---|---|
| CA | 2177622 A1 | 11/1997 |
| CN | 108351947 A | 7/2018 |
| CN | 110089068 A | 8/2019 |

(Continued)

OTHER PUBLICATIONS

International Search Report and Written Opinion for International Application No. PCT/CN2020/090350, mailed on Feb. 18, 2021, 6 pages.

(Continued)

*Primary Examiner* — Congvan Tran
(74) *Attorney, Agent, or Firm* — Barta Jones, PLLC

(57) ABSTRACT

Example embodiments of the present disclosure relate to partial integrity protection in telecommunication systems. According to embodiments of the present disclosure, there is provided a solution for implementing partial integrity protection. The terminal device receives configuration of the partial integrity protection and applies the integrity protection on a portion of data packets which are communicated between communication devices. In this way, the communication devices can always provide integrity protection for services, regardless of their bit rate. Thus, security of communication can be improved. It also allows to provide integrity protection with limited impacts to power consumption and overheating.

18 Claims, 7 Drawing Sheets

(56) References Cited

FOREIGN PATENT DOCUMENTS

| CN | 110419205 A | 11/2019 |
|---|---|---|
| WO | 2019/095209 A1 | 5/2019 |
| WO | 2019/159788 A1 | 8/2019 |

OTHER PUBLICATIONS

Office action received for corresponding Indian Patent Application No. 202217070647, dated Sep. 13, 2024, 6 pages.

"3rd Generation Partnership Project; Technical Specification Group Radio Access Network; NR; Packet Data Convergence Protocol (PDCP) specification (Release 15)", 3GPP TS 38.323, V15.6.0, Jun. 2019, pp. 1-26.

"3rd Generation Partnership Project; Technical Specification Group Services and System Aspects; System architecture for the 5G System (5GS); Stage 2 (Release 16)", 3GPP TS 23.501, V16.4.0, Mar. 2020, pp. 1-430.

"3rd Generation Partnership Project; Technical Specification Group Radio Access Network; NG-RAN; NG Application Protocol (NGAP) (Release 16)", 3GPP TS 38.413, V16.1.0, Mar. 2020, pp. 1-341.

"3rd Generation Partnership Project; Technical Specification Group Radio Access Network; NR; NR and NG-RAN Overall Description; Stage 2 (Release 16)", 3GPP TS 38.300, V16.0.0, Dec. 2019, pp. 1-101.

"3rd Generation Partnership Project; Technical Specification Group Services and System Aspects; Procedures for the 5G System (5GS); Stage 2 (Release 16)", 3GPP TS 23.502, V16.4.0, Mar. 2020, pp. 1-582.

"3rd Generation Partnership Project; Technical Specification Group Radio Access Network; NR; Radio Resource Control (RRC) protocol specification (Release 15)", 3GPP TS 38.331, V15.9.0, Mar. 2020, pp. 1-536.

"Mandatory User Plane Integrity for 5G", 3GPP TSG RAN Meeting #87e, RP-200038, GSM Association, Mar. 16-19, 2020, pp. 1-3.

"Way Forward on mandatory UE support of full rate user plane integrity protection for 5G SA option 2 in Rel-16", 3GPP TSG-RAN Meeting #87-e, RP-200505, Deutsche Telekom, Mar. 16-19, 2020, 4 pages.

"IEEE 802.11", Wikipedia, Retrieved on Feb. 13, 2024, Webpage available at :https://en.wikipedia.org/wiki/IEEE_802.11.

Extended European Search Report received for corresponding European Patent Application No. 20935919.9, dated Dec. 22, 2023, 8 pages.

Office action received for corresponding European Patent Application No. 20935919.9, dated Jul. 31, 2024, 4 pages.

\* cited by examiner

PARTIAL INTEGRITY PROTECTION IN TELECOMMUNICATION SYSTEMS

CROSS-REFERENCE TO RELATED APPLICATIONS

This application is a national stage entry of International Application No. PCT/CN2020/090350, filed May 14, 2020, entitled "PARTIAL INTEGRITY PROTECTION IN TELECOMMUNICATION SYSTEMS" which is hereby incorporated by reference in its entirety.

FIELD

Embodiments of the present disclosure generally relate to the field of telecommunication and in particular, to methods, devices, apparatuses and computer readable storage medium for partial integrity protection in telecommunication systems.

BACKGROUND

With development of communication systems, more and more technologies have been proposed. Different technologies for improving communication security have been introduced. For example, data communicated among devices can be ciphered. Further, integrity protection has been proposed which is a scheme that guards the signalling traffic in the air interface against unauthorized attacks.

SUMMARY

In general, example embodiments of the present disclosure provide a solution for partial integrity protection in telecommunication systems.

In a first aspect, there is provided a first device. The first device comprises at least one processor; and at least one memory including computer program codes; the at least one memory and the computer program codes are configured to, with the at least one processor, cause the first device to: transmit to a second device information of data rate for integrity protection which is supported by the first device. The first device is also caused to receive from the second device configuration information of the integrity protection, the configuration information indicating that the integrity protection is performed on a portion of a plurality of data packets which are communicated between the first device and the second device. The first device is further caused to apply the integrity protection on the portion of the plurality of data packets based on the configuration information.

In a second aspect, there is provided a second device. The second device comprises at least one processor; and at least one memory including computer program codes; the at least one memory and the computer program codes are configured to, with the at least one processor, cause the second device to receive from a first device information of data rate for integrity protection which is supported by the first device. The second device is further caused to determine configuration information of the integrity protection based at least in part on the information of data rate, the configuration information indicating that the integrity protection is performed on a portion of a plurality of data packets which are communicated between the first device and the second device. The second device is also caused to transmit to the first device the configuration information.

In a third aspect, there is provided a method. The method comprises transmitting, at a first device and to a second device, information of data rate for integrity protection which is supported by the first device. The method also comprises receiving from the second device configuration information of the integrity protection, the configuration information indicating that the integrity protection is performed on a portion of a plurality of data packets which are communicated between the first device and the second device. The method further comprises applying the integrity protection on the portion of the plurality of data packets based on the configuration information.

In a fourth aspect, there is provided a method. The method comprises receiving, at a second device and from a first device, information of data rate for integrity protection which is supported by the first device. The method also comprises determining configuration information of the integrity protection based at least in part on the information of data rate, the configuration information indicating that the integrity protection is performed on a portion of a plurality of data packets which are communicated between the first device and the second device. The method further comprises transmitting to the first device the configuration information.

In a fifth aspect, there is provided an apparatus. The apparatus comprises means for transmitting, at a first device and to a second device, information of data rate for integrity protection which is supported by the first device; means for receiving from the second device configuration information of the integrity protection, the configuration information indicating that the integrity protection is performed on a portion of a plurality of data packets which are communicated between the first device and the second device; and means for applying the integrity protection on the portion of the plurality of data packets based on the configuration information.

In a sixth aspect, there is provided an apparatus. The apparatus comprises means for receiving, at a second device and from a first device, information of data rate for integrity protection which is supported by the first device; means for determining configuration information of the integrity protection based at least in part on the information of data rate, the configuration information indicating that the integrity protection is performed on a portion of a plurality of data packets which are communicated between the first device and the second device; and means transmitting to the first device the configuration information.

In a seventh aspect, there is provided a computer readable medium. The computer readable medium comprises program instructions for causing an apparatus to perform at least the method according to any one of the above third and fourth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
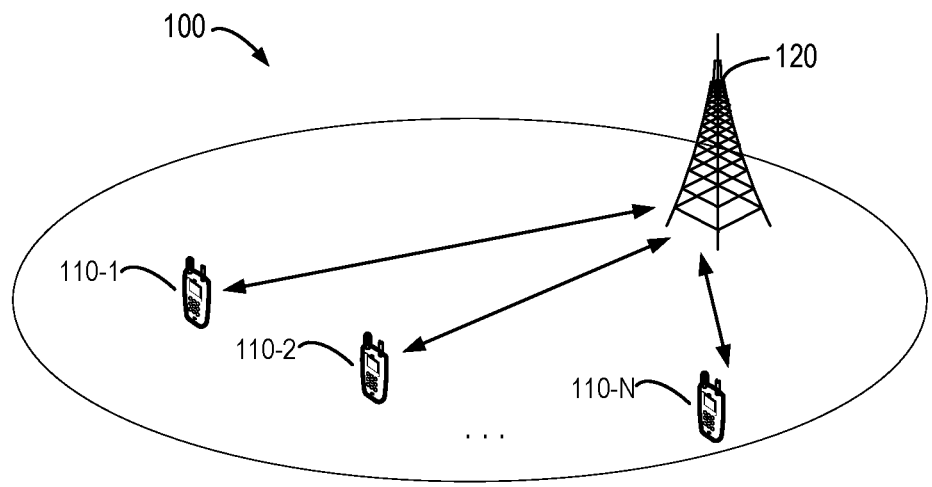
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated and Access Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, the gNB can be split into a centralized unit (CU) and a decentralized unit (DU). That CU hosts the higher layers of the protocol stack including the radio resource control (RRC) and packet data convergence protocol (PDCP) while the DU hosts the lower layers such as the physical layer, medium access control (MAC) layer and radio link control (RLC) layer.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mentioned above, the integrity protection of user plane data has been proposed. In particular, the integrity protection in radio access network (RAN) had been so far limited to the control plane, i.e., signaling radio bearers (SRBs) for long term evolution (LTE). But in order to increase security, new radio (NR) system expands the usage of RAN integrity protection (IP) to the user plane.

The User Plane Security Enforcement information is determined by session management function (SMF) upon protocol data unit (PDU) session establishment. If the User Plane Security Enforcement information indicates that Integrity Protection is "Preferred" or "Required", the SMF also includes the UE Integrity Protection Maximum Data Rate.

In particular, for each PDU session for which the Security Indication information element (IE) is included in the PDU Session Resource Setup Request Transfer IE of the PDU SESSION RESOURCE SETUP REQUEST message, and the Integrity Protection Indication IE or Confidentiality Protection Indication IE is set to "required", then the NG-RAN node shall perform user plane integrity protection or ciphering, respectively, for the concerned PDU session. If the nest generation (NG)-RAN node cannot perform the user plane integrity protection or ciphering, it shall reject the setup of the PDU session resources with an appropriate cause value.

For each PDU session for which the Security Indication IE is included in the PDU Session Resource Setup Request Transfer IE of the PDU SESSION RESOURCE SETUP REQUEST message, and the Integrity Protection Indication IE or Confidentiality Protection Indication IE is set to "preferred", then the NG-RAN node should, if supported, perform user plane integrity protection or ciphering, respectively, for the concerned PDU session and shall notify whether it performed the user plane integrity protection or ciphering by including the Integrity Protection Result IE or Confidentiality Protection Result IE, respectively, in the PDU Session Resource Setup Response Transfer IE of the PDU SESSION RESOURCE SETUP RESPONSE message.

For each PDU session for which the Maximum Integrity Protected Data Rate Downlink IE or the Maximum Integrity Protected Data Rate Uplink IE are included in the Security Indication IE in the PDU Session Resource Setup Request Transfer IE of the PDU SESSION RESOURCE SETUP REQUEST message, the NG-RAN node shall store the respective information and, if integrity protection is to be performed for the PDU session, it shall enforce the traffic limits corresponding to the received values, for the concerned PDU session and concerned UE.

Integrity protection can be configured per DRB but all DRBs belonging to a PDU session for which the User Plane Security Enforcement information indicates that UP integrity protection is required, are configured with integrity protection.

Integrity protection may be performed at the packet data convergence protocol (PDCP) sublayer. The integrity protection function may include both integrity protection and integrity verification and may be performed in PDCP, if configured. The data unit that is integrity protected is the PDU header and the data part of the PDU before ciphering. The integrity protection is always applied to PDCP Data PDUs of signaling radio bears (SRBs). The integrity protection is applied to PDCP Data PDUs of DRBs for which integrity protection is configured. The integrity protection is not applicable to PDCP Control PDUs.

The integrity protection algorithm and key to be used by the PDCP entity are configured by upper layers. The integrity protection function may be activated/suspended/resumed by upper layers. When security is activated and not suspended, the integrity protection function shall be applied to all PDUs including and subsequent to the PDU indicated by upper layers for the downlink and the uplink, respectively.

However, according to conventional technologies, the integrity protection may be either turned off or on for a PDU session. The terminal device has no other choice but to integrity protect all packets from that PDU session when integrity protection is configured.

According to embodiments of the present disclosure, there is provided a solution for implementing partial integrity protection. The terminal device receives configuration of the partial integrity protection and applies the integrity protection on a portion of data packets which are communicated between communication devices. In this way, the communication devices can always provide integrity protection for services, regardless of their bit rate. Thus, security of communication can be improved. It also allows to provide integrity protection with limited impacts to power consumption and overheating.

FIG. 1 illustrates a schematic diagram of a communication environment 100 in which embodiments of the present disclosure can be implemented. The communication environment 100, which is a part of a communication network, comprises a device 110-1, a device 110-2, . . . , a device 110-N, which can be collectively referred to as "first device(s) 110." The communication environment 100 further comprises a second device 120 that can communicate with the first device(s) 110.

The communication environment 100 may comprise any suitable number of devices and cells. In the communication environment 100, the first device 110 and the second device 120 can communicate data and control information to each other. In the case that the first device 110 is the terminal device and the second device 120 is the network device, a link from the second device 120 to the first device 110 is referred to as a downlink (DL), while a link from the first device 110 to the second device 120 is referred to as an uplink (UL). The second device 120 and the first device 110 are interchangeable.

It is to be understood that the number of first devices and cells and their connections shown in FIG. 1 is given for the purpose of illustration without suggesting any limitations. The environment 100 may include any suitable number of devices and networks adapted for implementing embodiments of the present disclosure.

Communications in the communication environment 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
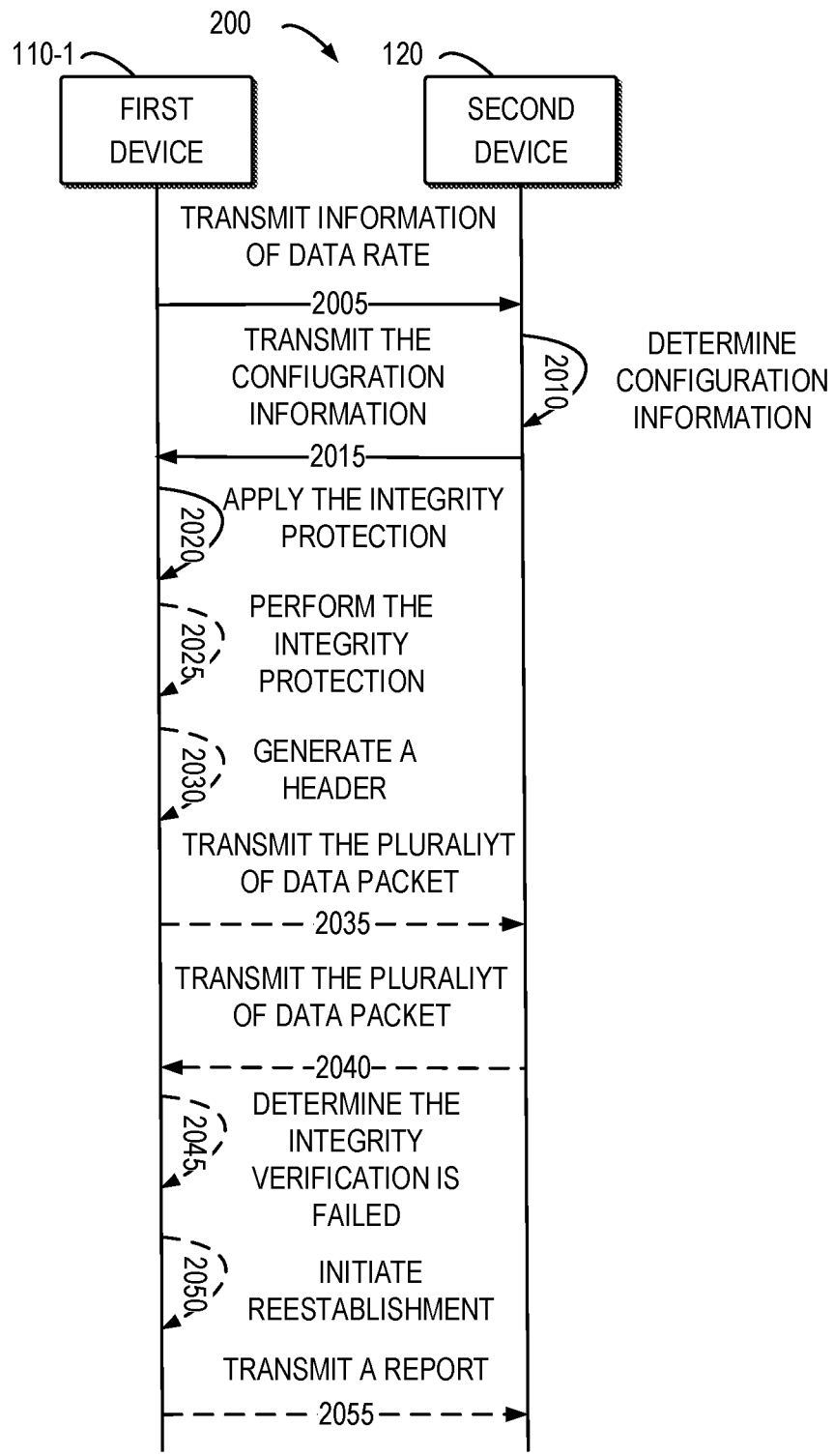
FIG. 2 illustrates a signaling flow for partial integrity protection according to some example embodiments of the present disclosure.

Example embodiments of the present disclosure will be described in detail below with reference to the accompanying drawings. Reference is now made to FIG. 2, which illustrates a signaling flow 200 for reporting reports of random access procedures according to example embodiments of the present disclosure. For the purpose of discussion, the signaling flow 200 will be described with reference to FIG. 1. The signaling flow 200 may involve the first device 110-1 and the second device 120.

The first device 110-1 transmits 2005 information of data rate for the integrity protection which can be supported by the first device 110-1. For example, the information may indicate the maximum data rate up to which the first device 110-1 can support integrity protection. The maximum supported data rate for integrity protected DRBs may be a UE capability indicated at non-access stratum (NAS) layer. Alternatively, the maximum supported data rate for integrity protected DRBs may be indicated at access stratum layer.

In some example embodiments, the information may indicate that the partial integrity protection is preferred at the first device 110-1. For example, an indication may be included in the information concerning the partial integrity protection.

The second device 120 determines 2010 configuration information of the integrity protection. The configuration information indicates that the integrity protection is performed on a portion of a plurality of data packets which are communicated between the first device 110-1 and the second device 120. The configuration information can be applied for uplink transmissions. Alternatively or in addition, the configuration information can also be applied for downlink transmissions. The second device 120 may calculate the partial integrity protection based on the UE capability and the data rate. In this way, the communication device (for example, the first device 110-1 or the second device) with integrity protection processing limitations (for example, due to lack of dedicated hardware accelerators) can always provide some level of integrity protection for all type of services, regardless of how high their bit rates are. It also allows to provide integrity protection with limited impacts to power consumption and overheating.

In some example embodiments, the configuration information may be configured per radio bearer, which means the partial integrity protection can be applied to the data packets on the radio bearer. In this situation, as many subsets of data packets as bearers with partial integrity protection can be configured. The configuration information may also be configured per PDU session, which means that all the bearers belong to the same PDU session can apply the partial integrity protection. In this situation, as many subsets of data packets as PDU sessions with partial integrity protection can be configured.

Alternatively, the configuration information may also be configured per UE. For example, all bearers of all PDU sessions can apply the same subset of data packets and only one subset can be configured. In other embodiments, the configuration information may also be configured per 5G quality of service identifier, 5QI.

In some example embodiments, the configuration information may indicate the first device 110-1 to perform the integrity protection on a best effort basis. In particular, the configuration information may not explicitly indicate the portion of the data packets for the integrity protection.

Furthermore, if no subset of data packets is configured for a bearer with partial integrity protection, the first device 110-1 can understand that the integrity protection shall be performed on a best effort basis. In that case, both the first device 110-1 and the second device 120 should minimize the number of PDCP PDUs that are not integrity protected and performs integrity protection to the best of their abilities. Radio bearers with the highest priority may be given a higher priority.

The configuration information may indicate configurations related to sequence number of a PDU. The integrity protection may be performed on the portion of the plurality of data packets to be transmitted in this PDU. The first device 110-1 may determine to perform the integrity protection of the PDU based on the configuration and the sequence number. For example, if the configuration indicate ¼ of the PDUs are to be integrity protected, the integrity protection may be performed on every 4 PDU. For example integrity protection is done to a PDU if the sequence number of the PDU mod 4=0. In other example embodiments, the configuration information may indicate a range of sequence numbers. For example, the configuration information may indicate the sequence numbers 2 and 4, the integrity protection may be performed on every $2^{nd}$ PDU and every $4^{th}$ PDU. Alternatively or in addition, the configuration information may indicate a proportion value of the plurality of data packets for the integrity protection. For example, if the proportion value is ½, the integrity protection may be performed on a half of the plurality of data packets and which PDUs are integrity protected are known implicitly by the sequence numbers.

In some example embodiments, the configuration information may indicate a first timer. During the running of the first timer, the first device 110-1 may apply the integrity protection on the portion of data packets. Alternatively or in addition, the configuration information may further comprise a second timer during which at least one integrity protected data packet is performed. In other embodiments, the configuration information may indicate a third timer during which at least one unprotected data packet is allowed. Details of the timers will be described later.

The second device 120 transmits 2015 the configuration information to the first device 110-1. For example, the configuration information may be transmitted via RRC signaling. If the second device 120 determine to activate the integrity protection, the configuration information may be transmitted. Alternatively, the configuration information may be transmitted if the integrity protection is to be deactivated.

The first device 110-1 applies 2020 the integrity protection on the portion of the plurality of data packets. For example, the first device 110-1 may perform 2025 the integrity protection on the portion of the plurality of data packets. In some example embodiments, the first device 110-1 may obtain a sequence number of the PDU from the configuration information. The first device 110-1 may perform the integrity protection on the portion of the plurality of data packets to be transmitted in the PDU. For example, if the sequence number indicates $4^{th}$ PDU, the first device 110-1 may perform the integrity protection on every $4^{th}$ PDU.

Alternatively, the first device 110-1 may obtain a proportion value of the plurality of data packets from the configuration information. The first device 110-1 may determine the portion of data packets from the plurality of data packets based on the proportion value and perform the integrity protection on the portion of data packets. For example, if the proportion value is ½, the integrity protection may be performed on a half of the plurality of data packets.

In some example embodiments, the first timer may be obtained from the configuration information. The first device 110-1 may perform the integrity protection on the portion of data packets during running of the first timer. For example, if the first timer is 80 ms, at least one PDU needs to be integrity protected every 80 ms.

Alternatively, the first device 110-1 may obtain the third timer from the configuration information. For example, the first device 110-1 may start the third timer upon generating an integrity protected PDCP PDU and when the timer is running, the first device 110-1E can generate PDCP PDUs without integrity protection. When the third timer is not running, the first device 110-1 shall integrity protect the next PDCP PDU which it generates and start the third timer. Additionally, the third timer may be configured to be (re-) started every Nth integrity protected PDCP PDU, and hence, in case the third timer is not running, the first device 110-1 may receive or shall generate the next N PDCP PDUs integrity protected.

Figure 3A:
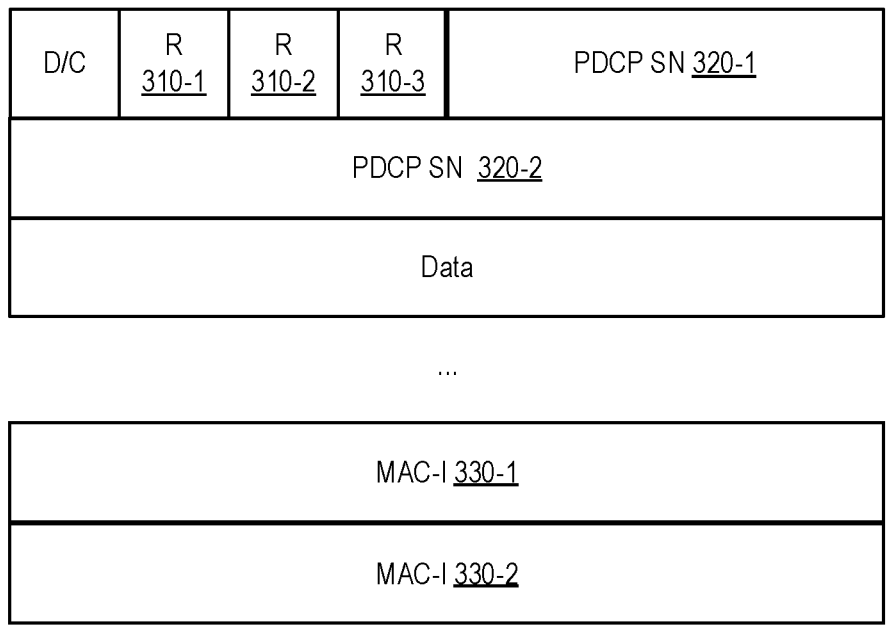
FIGS. 3A and 3B illustrate formats for data radio bearers, respectively.
Figure 3B:
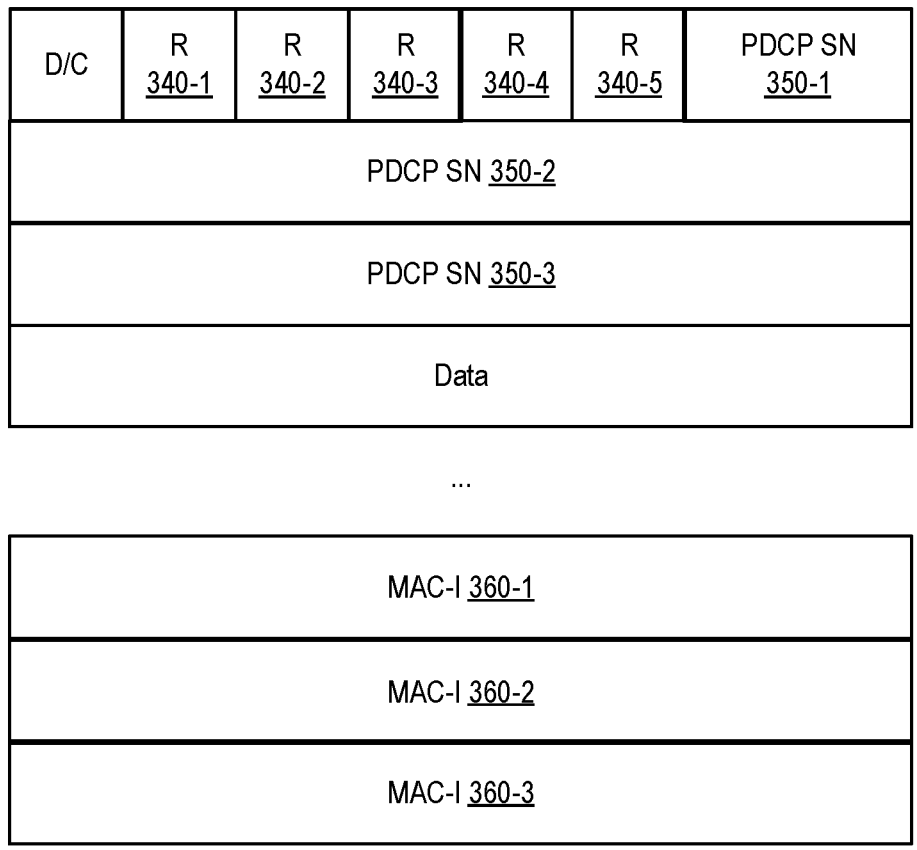

The first device 110-1 may generate 2030 a header of the PDU. The PDU may indicate whether the PDU is integrity protected. for example, the head may comprise at least one bit to indicate whether the PDU is integrity protected. FIG. 3A the format of the PDCP Data PDU with 12 bits PDCP sequence number (SN). FIG. 3B shows the format of the PDCP Data PDU with 18 bits PDCP SN. One Reserved bit (for example, the reserved bits 310-1, 310-2 and 310-1 shown in FIG. 3A and/or the reserved bits 340-1, 340-2, 340-3, 340-4 and 340-5 in FIG. 3B) in the PDCP PDU header may be used to dynamically signal whether a MAC-I is present or not, i.e., to signal whether that particular PDU is integrity protected or not. For example, if the PDCP 320-1 is integrity protected, the MAC-I 330-1 may be present. If the PDCP 320-2 is not integrity protected, the MAC-I 330-2 may be omitted. Similarly, the presences of the MAC-I 360-1, 360-2 and 360-3 may represent whether the PDU 350-1, 350-2 or 350-3 is integrity protected or not, respectively.

The first device 110-1 may transmit 2035 the plurality of data packets with the header to the second device 120. The second device 120 may decode the portion of the data packets based on the configuration information and perform an integrity protection verification on the portion of data packets.

In downlink situation, the second device 120 may transmit 2040 the plurality of data packets to the first device 110-1. The first device 110-1 may decode the portion of the data packets based on the configuration information and perform an integrity protection verification on the portion of data packets.

The first device 110-1 may determine 2045 whether the integrity verification is failed based on the integrity protection verification. In some example embodiments, the first device 110-1 may determine a number of consecutive unprotected data packets in the received plurality of data packets. If the number of unprotected data packets exceeds a threshold number, the integrity protection is failed. The threshold number may be configurable and can be any suitable number.

In some example embodiments, the first device 110-1 may obtain the second timer from the configuration information. The second timer may be restarted every time integrity verification passes for a received PDCP PDU. If the second timer expires without having received any integrity protected PDCP PDUs, the first device 110-1 may determine that the integrity protection is failed. The PDCP layer can then indicate integrity verification failure to upper layer. In some embodiments, the second timer may be linked to a discontinuous reception timer. For example, if the first device 110-1 is not in active time, the second timer may be paused.

Alternatively, the first device 110-1 may obtain the third timer from the configuration information. The third timer may be restarted every time an integrity protected PDCP PDU (with verification passed) is received. When the third timer is running, non-integrity protected PDCP PDUs are allowed. If the third timer is not running and a number of non-integrity protected PDCP PDUs are received, the first device 110-1 may determine that the integrity protection is failed. The PDCP layer can then indicate integrity verification failure to upper layer.

If the integrity verification is failed, the first device 110-1 may initiate 2050 re-establishment of RRC connection between the first device 110-1 and the second device 120. Alternatively, the first device 110-1 may transmit 2055 a report indicating the integrity protection failure to the second device 120.

In other example embodiments, the first device 110-1 may obtain a fourth timer from the configuration information. When the fourth timer is running, the first device 110-1 may not perform the integrity protection. The first device 110-1 may perform the integrity protection after an expiration of the fourth timer. The fourth timer may be restarted after the integrity protection is performed. If the fourth timer is not running and a number of non-integrity protected PDCP PDUs are received, PDCP can indicate integrity verification failure to upper layer. Such behavior may be implemented also in uplink direction where the first device 110-1 may (re-)start the fourth timer upon generating an integrity protected PDCP PDU and when the fourth timer is running, the first device 110-1 can generate PDCP PDUs without integrity protection. When the fourth timer is not running, the first device 110-1 shall integrity protect the next PDCP PDU it generates and start the timer. Additionally, the fourth timer could be configured to be (re-)started every Nth integrity protected PDCP PDU, and hence, in case the fourth timer is not running, the first device 110-1 should receive or shall generate the next N PDCP PDUs integrity protected.

According to embodiments of the present disclosure, the partial integrity protection can be achieved. In this way, the partial integrity protection can be implemented even though the data rate of the communication device is not high enough, thereby improving communication security. Further, it also allows to provide integrity protection with limited impacts to power consumption and overheating.

Figure 4:
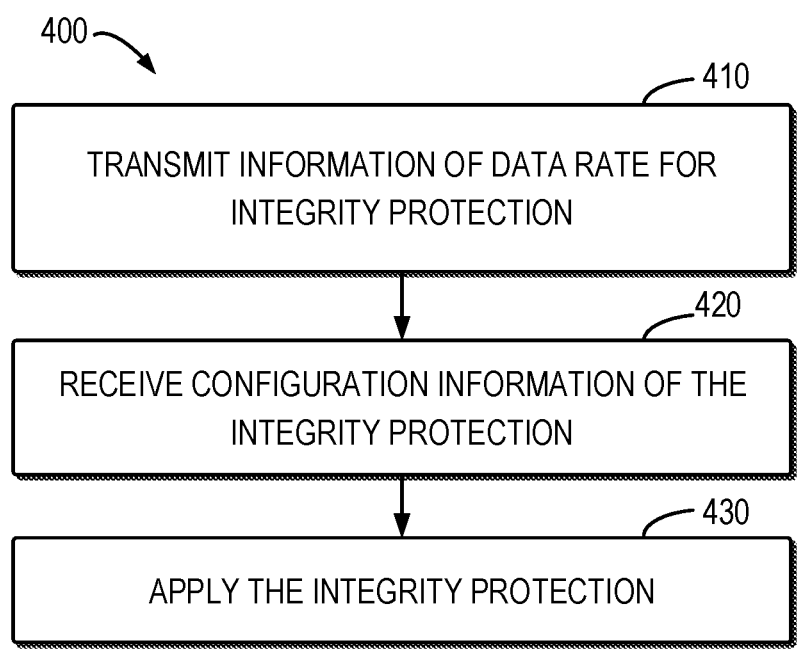
FIG. 4 illustrates a flowchart of a method implemented at a first apparatus according to some example embodiments of the present disclosure.

FIG. 4 shows a flowchart of an example method 400 implemented at a first device 110 in accordance with some example embodiments of the present disclosure. For the purpose of discussion, the method 400 will be described from the perspective of the first device 110-1.

At block 410, the first device 110-1 transmits information of data rate for the integrity protection which can be supported by the first device 110-1. For example, the information may indicate the maximum data rate up to which the first device 110-1 can support integrity protection. The maximum supported data rate for integrity protected DRBs may be a UE capability indicated at NAS layer. Alternatively, the UE capability may be indicated at access stratum layer.

In some example embodiments, the information may indicate that the partial integrity protection is preferred at the first device 110-1. For example, an indication may be included in the information concerning the partial integrity protection.

The configuration information indicates that the integrity protection is performed on a portion of a plurality of data packets which are communicated between the first device 110-1 and the second device 120. The configuration information can be applied for uplink transmissions. Alternatively or in addition, the configuration information can also be applied for downlink transmissions. The second device 120 may calculate the partial integrity protection based on the UE capability and the data rate. In this way, the communication device (for example, the first device 110-1 or the second device) with integrity protection processing limitations (for example, due to lack of dedicated hardware accelerators) can always provide some level of integrity protection for all type of services, regardless of how high their bit rates are. It also allows to provide integrity protection with limited impacts to power consumption and overheating.

In some example embodiments, the configuration information may be configured per radio bearer, which means the partial integrity protection can be applied to the data packets on the radio bearer. In this situation, as many subsets of data packets as bearers with partial integrity protection can be configured. The configuration information may also be configured per PDU session, which means that all the bearers belong to the same PDU session can apply the partial integrity protection. In this situation, as many subsets of data packets as PDU sessions with partial integrity protection can be configured.

Alternatively, the configuration information may also be configured per UE. For example, all bearers of all PDU sessions can apply the same subset of data packets and only one subset can be configured. In other embodiments, the configuration information may also be configured per 5G quality of service identifier, 5QI.

In some example embodiments, the configuration information may indicate the first device 110-1 to perform the integrity protection on a best effort basis. In particular, the configuration information may not explicitly indicate the portion of the data packets for the integrity protection.

Furthermore, if no subset of data packets is configured for a bearer with partial integrity protection, the first device 110-1 can understand that the integrity protection shall be performed on a best effort basis. In that case, both the first device 110-1 and the second device 120 should minimize the number of PDCP PDUs that are not integrity protected and performs integrity protection to the best of their abilities. Radio bearers with the highest priority may be given a higher priority.

The configuration information may indicate a sequence number of a PDU. The integrity protection may be performed on the portion of the plurality of data packets to be transmitted in this PDU. For example, if the sequence number indicates $4^{th}$ PDU, the integrity protection may be performed on the PDU. Alternatively or in addition, the configuration information may indicate a proportion value of the plurality of data packets for the integrity protection. For example, if the proportion value is ½, the integrity protection may be performed on a half of the plurality of data packets.

In some example embodiments, the configuration information may indicate a first timer. During the running of the first timer, the first device 110-1 may apply the integrity protection on the portion of data packets. Alternatively or in addition, the configuration information may further comprise a second timer during which at least one integrity protected data packet is performed. In other example embodiments, the configuration information may indicate a third timer during which at least one unprotected data packet is allowed. Alternatively, the configuration information may a fourth timer during which no integrity protection is performed.

At block 420, the first device 110-1 receives the configuration information from the second device 120. For example, the configuration information may be transmitted via RRC signaling.

At block 430, the first device 110-1 applies the integrity protection on the portion of the plurality of data packets. For example, the first device 110-1 may perform the integrity protection on the portion of the plurality of data packets. In some example embodiments, the first device 110-1 may obtain a sequence number of the PDU from the configuration information. The first device 110-1 may perform the integrity protection on the portion of the plurality of data packets to be transmitted in the PDU. For example, if the sequence number indicates $4^{th}$ the first device 110-1 may perform the integrity PDU, protection on every $4^{th}$ PDU.

Alternatively, the first device 110-1 may obtain a proportion value of the plurality of data packets from the configuration information. The first device 110-1 may determine the portion of data packets from the plurality of data packets based on the proportion value and perform the integrity protection on the portion of data packets. For example, if the proportion value is ½, the integrity protection may be performed on a half of the plurality of data packets.

In some example embodiments, the first timer may be obtained from the configuration information. The first device 110-1 may perform the integrity protection on the portion of data packets during running of the first timer. For example, if the first timer is 80 ms, at least one PDU needs to be integrity protected every 80 ms.

Alternatively, the first device 110-1 may obtain the third timer from the configuration information. For example, the first device 110-1 may start the third timer upon generating an integrity protected PDCP PDU and when the timer is running, the first device 110-1E can generate PDCP PDUs without integrity protection. When the third timer is not running, the first device 110-1 shall integrity protect the next PDCP PDU which it generates and start the third timer. Additionally, the third timer may be configured to be (re-)started every Nth integrity protected PDCP PDU, and hence, in case the third timer is not running, the first device 110-1 may receive or shall generate the next N PDCP PDUs integrity protected.

The first device 110-1 may generate a header of the PDU on which a data packet is to be transmitted. The PDU may indicate whether the PDU is integrity protected. For example, the head may comprise at least one bit to indicate whether the PDU is integrity protected. The first device 110-1 may transmit the plurality of data packets with the header to the second device 120.

In downlink situation, the second device 120 may transmit the plurality of data packets to the first device 110-1. The first device 110-1 may decode the portion of the data packets based on the configuration information and perform an integrity protection verification on the portion of data packets.

The first device 110-1 may determine whether the integrity protection is failed based on the integrity protection verification. In some example embodiments, the first device 110-1 may determine a number of consecutive unprotected data packets in the received plurality of data packets. If the number of unprotected data packets exceeds a threshold number, the integrity protection is failed. The threshold number may be configurable and can be any suitable number.

In some example embodiments, the first device 110-1 may obtain the second timer from the configuration information. The second timer may be restarted every time integrity verification passes for a received PDCP PDU. If the second timer expires without having received any integrity protected PDCP PDUs, the first device 110-1 may determine that the integrity protection is failed. The PDCP layer can then indicate integrity verification failure to upper layer. In some embodiments, the second timer may be linked to a discontinuous reception timer. For example, if the first device 110-1 is not in active time, the second timer may be paused.

Alternatively, the first device 110-1 may obtain the third timer from the configuration information. The third timer may be restarted every time an integrity protected PDCP PDU (with verification passed) is received. When the third time is running, non-integrity protected PDCP PDUs are allowed. If the third timer is not running and a number of non-integrity protected PDCP PDUs are received, the first device 110-1 may determine that the integrity protection is failed. The PDCP layer can then indicate integrity verification failure to upper layer.

If the integrity protection is failed, the first device 110-1 may initiate re-establishment of RRC connection between the first device 110-1 and the second device 120. Alternatively, the first device 110-1 may transmit a report indicating the integrity protection failure to the second device 120.

In other example embodiments, the first device 110-1 may obtain a fourth timer from the configuration information. When the fourth timer is running, the first device 110-1 may not perform the integrity protection. The first device 110-1 may perform the integrity protection after an expiration of the fourth timer. The fourth timer may be restarted after the integrity protection is performed. If the fourth timer is not running and a number of non-integrity protected PDCP PDUs are received, PDCP can indicate integrity verification failure to upper layer. Such behavior could be implemented also in uplink direction where the first device 110-1 may (re-)start a fourth timer upon generating an integrity protected PDCP PDU and when the fourth timer is running, the first device 110-1 can generate PDCP PDUs without integrity protection. When the fourth timer is not running, the first device 110-1 shall integrity protect the next PDCP PDU it generates and start the fourth timer. Additionally, the fourth timer could be configured to be (re-)started every Nth integrity protected PDCP PDU, and hence, in case the fourth timer is not running, the first device 110-1 should receive or shall generate the next N PDCP PDUs integrity protected.

Figure 5:
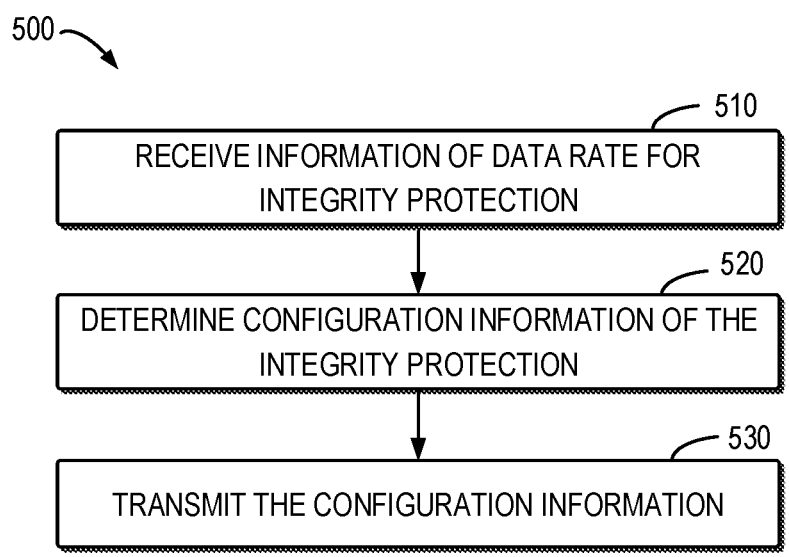
FIG. 5 illustrates a flowchart of a method implemented at a second apparatus according to some other example embodiments of the present disclosure.

FIG. 5 shows a flowchart of an example method 500 implemented at a second device 120 in accordance with some example embodiments of the present disclosure. For the purpose of discussion, the method 800 will be described from the perspective of the second device 120.

At block 510, the second device 120 receives information of data rate for the integrity protection which can be supported by the first device 110-1. For example, the information may indicate the maximum data rate up to which the first device 110-1 can support integrity protection. The maximum supported data rate for integrity protected DRBs may be a UE capability indicated at NAS layer.

In some example embodiments, the information may indicate that the partial integrity protection is preferred at the first device 110-1. For example, an indication may be included in the information concerning the partial integrity protection.

At block 520, the second device 120 determines configuration information of the integrity protection. The configuration information indicates that the integrity protection is performed on a portion of a plurality of data packets which are communicated between the first device 110-1 and the second device 120. The configuration information can be applied for uplink transmissions. Alternatively or in addition, the configuration information can also be applied for downlink transmissions. The second device 120 may calculate the partial integrity protection based on the UE capability and the data rate. In this way, the communication device (for example, the first device 110-1 or the second device) with integrity protection processing limitations (for example, due to lack of dedicated hardware accelerators) can always provide some level of integrity protection for all type of services, regardless of how high their bit rates are. It also allows to provide integrity protection with limited impacts to power consumption and overheating.

In some example embodiments, the configuration information may be configured per radio bearer, which means the partial integrity protection can be applied to the data packets on the radio bearer. In this situation, as many subsets of data packets as bearers with partial integrity protection can be configured. The configuration information may also be configured per PDU session, which means that all the bearers belong to the same PDU session can apply the partial integrity protection. In this situation, as many subsets of data packets as PDU sessions with partial integrity protection can be configured.

Alternatively, the configuration information may also be configured per UE. For example, all bearers of all PDU sessions can apply the same subset of data packets and only one subset can be configured. In other embodiments, the configuration information may also be configured per 5G quality of service identifier, 5QI.

In some example embodiments, the configuration information may indicate the first device 110-1 to perform the integrity protection on a best effort basis. In particular, the configuration information may not explicitly indicate the portion of the data packets for the integrity protection.

Furthermore, if no subset of data packets is configured for a bearer with partial integrity protection, the first device 110-1 can understand that the integrity protection shall be performed on a best effort basis. In that case, both the first device 110-1 and the second device 120 should minimize the number of PDCP PDUs that are not integrity protected and performs integrity protection to the best of their abilities. Radio bearers with the highest priority may be given a higher priority.

The configuration information may indicate a sequence number of a PDU. The integrity protection may be performed on the portion of the plurality of data packets to be transmitted in this PDU. For example, if the sequence number indicates $4^{th}$ PDU, the integrity protection may be performed on the PDU. Alternatively or in addition, the configuration information may indicate a proportion value of the plurality of data packets for the integrity protection. For example, if the proportion value is ½, the integrity protection may be performed on a half of the plurality of data packets.

In some example embodiments, the configuration information may indicate a first timer. During the running of the first timer, the first device 110-1 may apply the integrity protection on the portion of data packets. Alternatively or in addition, the configuration information may further comprise a second timer during which at least one integrity protected data packet is performed. In other embodiments, the configuration information may indicate a third timer during which at least one unprotected data packet is allowed. Alternatively, the configuration information may a fourth timer during which no integrity protection is performed.

At block 530, the second device 120 transmits the configuration information to the first device 110-1. For example, the configuration information may be transmitted via RRC signaling.

In downlink situation, the second device 120 may transmit the plurality of data packets to the first device 110-1. If the integrity protection is failed, the first device 110-1 may initiate 2050 re-establishment of RRC connection between the first device 110-1 and the second device 120. Alternatively, the first device 110-1 may transmit 2055 a report indicating the integrity protection failure to the second device 120.

In some example embodiments, a first apparatus capable of performing any of the method 400 (for example, the first device 110) may comprise means for performing the respective operations of the method 400. The means may be implemented in any suitable form. For example, the means may be implemented in a circuitry or software module. The first apparatus may be implemented as or included in the first device 110. In some example embodiments, the means may comprise at least one processor and at least one memory including computer program code. The at least one memory and computer program code are configured to, with the at least one processor, cause performance of the apparatus.

In some example embodiments, the apparatus comprises means for transmitting, at a first device and to a second device, information of data rate for integrity protection which is supported by the first device; means for receiving from the second device configuration information of the integrity protection, the configuration information indicating that the integrity protection is performed on a portion of a plurality of data packets which are communicated between the first device and the second device; and means for applying the integrity protection on the portion of the plurality of data packets based on the configuration information.

In some example embodiments, the means for applying the integrity protection on the portion of the plurality of data packets comprises means for performing the integrity protection on a data packet from the plurality of data packets to be transmitted in a protocol data unit; means for generating a header of the protocol data unit, the header indicating that the protocol data unit is integrity protected is integrity protected; and means for transmitting to the second device the data packet in the protocol data unit with the header.

In some example embodiments, the means for applying the integrity protection comprises means for obtaining a sequence number of a protocol data unit from the configuration information; means for determining to perform integrity protection of the protocol data unit based on the configuration information and the sequence number; and means for performing the integrity protection on the portion of the plurality of data packets to be transmitted in the protocol data unit.

In some example embodiments, the means for applying the integrity protection comprises means for obtaining a proportion value of the plurality of data packets from the configuration information; means for determining the portion of data packets from the plurality of data packets based on the proportion value; and means for performing the integrity protection on the portion of data packets.

In some example embodiments, the means for applying the integrity protection comprises means for obtaining a first timer from the configuration information; and means for performing the integrity protection on the portion of data packets during running of the first timer.

In some example embodiments, the means for applying the integrity protection on the portion of the plurality of data packets comprises means for receiving the plurality of data packets from the second device; means for decoding the portion of data packets based on the configuration information; and means for performing integrity protection verification on the portion of data packets.

In some example embodiments, the apparatus comprises means for determining whether the integrity verification is failed; means for in accordance with a determination that the integrity verification is failed, initiating a re-establishment of radio resource control, RRC, connection between the first device and the second device; or means for in accordance with a determination that the integrity verification is failed, transmitting a report indicating a failure of the integrity protection to the second device.

In some example embodiments, the means for determining whether the integrity protection is failed comprises means for determining a number of consecutive unprotected data packets in the plurality of data packets; and means for in accordance with a determination that the number of unprotected data packets exceeds a threshold number, determining the integrity protection is failed.

In some example embodiments, the means for determining whether the integrity verification is failed comprises means for obtaining a second timer from the configuration information; and means for in accordance with a determination that there is lack of integrity protected data packet in the plurality of data packets during running of the second timer, determining the integrity verification is failed.

In some example embodiments, the second timer is linked to a discontinuous reception timer and the second timer is paused if the first device is not in active time.

In some example embodiments, the means for determining whether the integrity verification is failed comprises means for obtaining a third timer from the configuration information; and in accordance with a determination that at least one unprotected data packet is received without running the third timer, determining the integrity verification is failed.

In some example embodiments, the means for applying the integrity protection comprises means for obtaining a fourth timer from the configuration information; means for performing the integrity protection on the portion of the plurality of data packets after an expiration of the fourth timer; and means for restarting the fourth timer.

In some example embodiments, the means for transmitting the information of data rate for integrity protection comprises means for transmitting an indication indicating a partial integrity protection is preferred.

In some example embodiments, the configuration information is configured: per radio bearer, per protocol data unit session, per user equipment, or per 5G quality of service identifier, 5QI.

In some example embodiments, the first device comprises a terminal device and the second device comprises a network device.

In some example embodiments, a second apparatus capable of performing any of the method 500 (for example, the second device 120) may comprise means for performing the respective operations of the method 500. The means may be implemented in any suitable form. For example, the means may be implemented in a circuitry or software module. In some example embodiments, the means may comprise at least one processor and at least one memory including computer program code. The at least one memory and computer program code are configured to, with the at least one processor, cause performance of the apparatus. The second apparatus may be implemented as or included in the second device 120.

In some example embodiments, the apparatus comprises means for receiving, at a second device and from a first device, information of data rate for integrity protection which is supported by the first device; means for determining configuration information of the integrity protection based at least in part on the information of data rate, the configuration information indicating that the integrity protection is performed on a portion of a plurality of data packets which are communicated between the first device and the second device; and means for transmitting to the first device the configuration information.

In some example embodiments, the means for receiving the information of data rate for integrity protection comprises means for receiving an indication which indicates that a partial integrity protection is preferred.

In some example embodiments, the apparatus comprises means for receiving from the first device the portion of the plurality of data packets in a protocol data unit with a header indicating whether the protocol data unit is integrity protected; means for decoding the portion of data packets based on the configuration information; and means for performing integrity protection verification on the portion of data packets.

In some example embodiments, the means for determining the configuration information comprises means for determining at least one of a sequence number of a protocol data unit, wherein the integrity protection is performed on the portion of the plurality of data packets to be transmitted in the protocol data unit, a first timer during which the integrity protection is performed on the portion of data packets, a second timer during which at least one integrity protected data packet is performed, a third timer during which at least one unprotected data packet is allowed, or a fourth timer during which no integrity protection is performed.

In some example embodiments, the apparatus comprises means for receiving a report indicating a failure of the integrity verification to the second device; or means for receiving a request for re-establishment of radio resource control, RRC, connection between the first device and the second device.

In some example embodiments, the configuration information is configured: per radio bearer, per protocol data unit session, per user equipment, or per 5G quality of service identifier, 5QI.

In some example embodiments, the first device comprises a terminal device and the second device comprises a network device.

Figure 6:
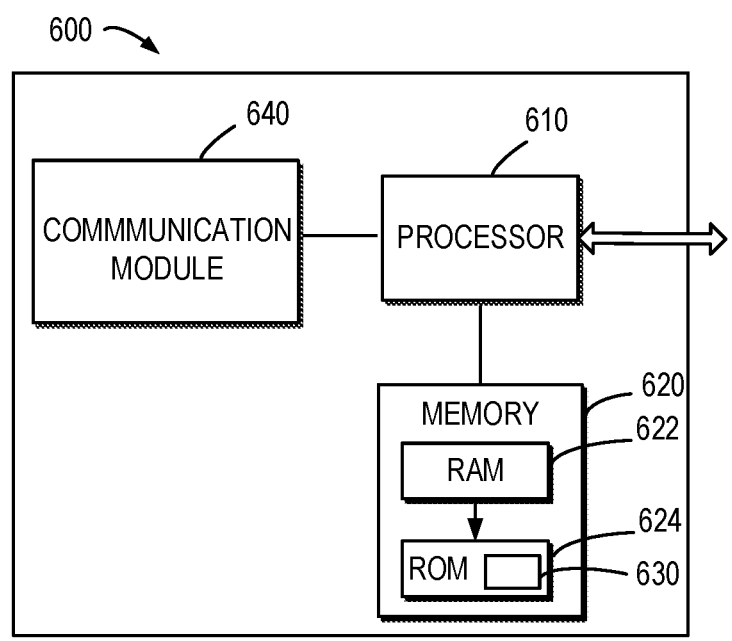
FIG. 6 illustrates a simplified block diagram of an apparatus that is suitable for implementing example embodiments of the present disclosure.

FIG. 6 is a simplified block diagram of a device 600 that is suitable for implementing example embodiments of the present disclosure. The device 600 may be provided to implement a communication device, for example, the first device 110 or the second device 120 as shown in FIG. 1. As shown, the device 600 includes one or more processors 610, one or more memories 620 coupled to the processor 610, and one or more communication modules 640 coupled to the processor 610.

The communication module 640 is for bidirectional communications. The communication module 640 has one or more communication interfaces to facilitate communication with one or more other modules or devices. The communication interfaces may represent any interface that is necessary for communication with other network elements. In some example embodiments, the communication module 640 may include at least one antenna.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the memory, e.g., ROM 624. The processor 610 may perform any suitable actions and processing by loading the program 630 into the RAM 622.

Some example embodiments of the present disclosure may be implemented by means of the program 630 so that the device 600 may perform any process of the disclosure as discussed with reference to FIGS. 2 to 5. The example embodiments of the present disclosure may also be implemented by hardware or by a combination of software and hardware.

Figure 7:
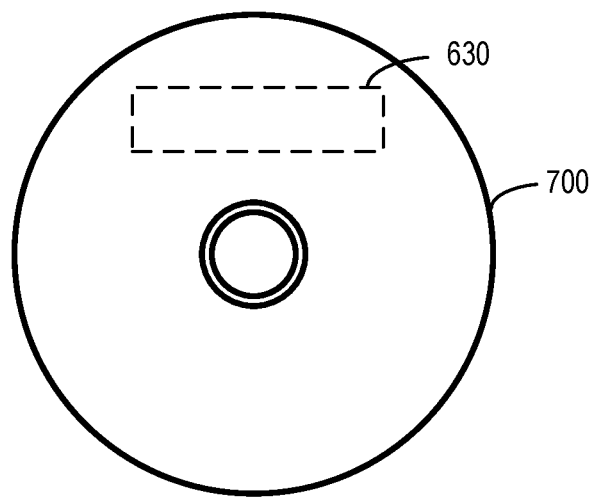
FIG. 7 illustrates a block diagram of an example computer readable medium in accordance with some example embodiments of the present disclosure.

In some example embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and other magnetic storage and/or optical storage. FIG. 7 shows an example of the computer readable medium 700 in form of an optical storage disk. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out any of the methods as described above with reference to FIGS. 2 to 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
   at least one processor; and
   at least one memory including computer program codes;
   the at least one memory and the computer program codes are configured to, with the at least one processor, cause the first device to:
   transmit, to a second device, information of data rate for integrity protection which is supported by the first device;
   receive from the second device configuration information of the integrity protection, the configuration information indicating that the integrity protection is performed on a portion of a plurality of data packets which are communicated between the first device and the second device; and
   apply the integrity protection on the portion of the plurality of data packets based on the configuration information by:
   performing the integrity protection on a data packet from the plurality of data packets which is to be transmitted in a protocol data unit;
   generating a header of the protocol data unit, the header indicating that the protocol data unit is integrity protected; and
   transmitting to the second device the data packet in the protocol data unit with the header.

2. The first device of claim 1, wherein the at least one processor and the computer program codes configured to cause the first device to apply the integrity protection comprises the at least one processor and the computer program codes configured to cause the first device to:
obtain a sequence number of a protocol data unit;
determine to perform the integrity protection of the protocol data unit based on the configuration information and the sequence number; and
perform the integrity protection on the portion of the plurality of data packets to be transmitted in the protocol data unit.

3. The first device of claim 1, wherein the at least one processor and the computer program codes configured to cause the first device to apply the integrity protection comprises the at least one processor and the computer program codes configured to cause the first device to:
obtain a proportion value of the plurality of data packets from the configuration information;
determine the portion of data packets from the plurality of data packets based on the proportion value; and
perform the integrity protection on the portion of data packets.

4. The first device of claim 1, wherein the at least one processor and the computer program codes configured to cause the first device to apply the integrity protection comprises the at least one processor and the computer program codes configured to cause the first device to:
obtain a first timer from the configuration information; and
perform the integrity protection on the portion of data packets during running of the first timer.

5. The first device of claim 1, wherein the at least one processor and the computer program codes configured to cause the first device to apply the integrity protection comprises the at least one processor and the computer program codes configured to cause the first device to:
receive the plurality of data packets from the second device;
decode the portion of data packets based on the configuration information; and
perform integrity protection verification on the portion of data packets.

6. The first device of claim 5, wherein the at least one processor and the computer program codes are further configured to cause the first device to:
determine whether the integrity verification is failed;
in accordance with a determination that the integrity verification is failed, initiate a re-establishment of radio resource control, RRC, connection between the first device and the second device; or
in accordance with a determination that the integrity verification is failed, transmit a report indicating a failure of the integrity protection to the second device.

7. The first device of claim 6, wherein the at least one processor and the computer program codes configured to cause the first device to determine whether the integrity verification comprises the at least one processor and the computer program codes configured to cause the first device to:
determine a number of consecutive unprotected data packets in the plurality of data packets; and
in accordance with a determination that the number of unprotected data packets exceeds a threshold number, determine the integrity verification is failed.

8. The first device of claim 6, wherein the at least one processor and the computer program codes configured to cause the first device to determine whether the integrity verification comprises the at least one processor and the computer program codes configured to cause the first device to:
obtain a second timer from the configuration information; and
in accordance with a determination that there is lack of integrity protected data packet in the plurality of data packets during running of the second timer, determine the integrity verification is failed.

9. The first device of claim 8, wherein the second timer is linked to a discontinuous reception timer and the second timer is paused if the first device is not in active time.

10. The first device of claim 6, wherein the at least one processor and the computer program codes configured to cause the first device to determine whether the integrity verification comprises the at least one processor and the computer program codes configured to cause the first device to:
obtain a third timer from the configuration information; and
in accordance with a determination that at least one unprotected data packet is received without running the third timer, determine the integrity verification is failed.

11. The first device of claim 1, wherein the at least one processor and the computer program codes are further configured to cause the first device to:
obtain a fourth timer from the configuration information;
perform the integrity protection on the portion of the plurality of data packets after an expiration of the fourth timer; and
restart the fourth timer.

12. The first device of claim 1, wherein the at least one processor and the computer program codes configured to cause the first device to transmit the information of data rate for integrity protection comprises the at least one processor and the computer program codes configured to cause the first device to:
transmit an indication indicating a partial integrity protection is preferred.

13. The first device of claim 1, wherein the configuration information is configured: per radio bearer, per protocol data unit session, per user equipment, or per 5G quality of service identifier, 5QI.

14. The first device of claim 1, wherein the first device comprises a terminal device and the second device comprises a network device.

15. A second device comprising:
at least one processor; and
at least one memory including computer program codes;
the at least one memory and the computer program codes are configured to, with the at least one processor, cause the second device to:
receive from a first device information of data rate for integrity protection which is supported by the first device;
receive an indication which indicates that a partial integrity protection is preferred;
determine configuration information of the integrity protection based at least in part on the information of data rate, the configuration information indicating that the integrity protection is performed on a portion of a plurality of data packets which are communicated between the first device and the second device; and
transmit to the first device the configuration information.

16. The second device of claim 15, wherein the at least one processor and the computer program codes are further configured to cause the second device is to:
  receive from the first device the portion of the plurality of data packets in a protocol data unit with a header indicating whether the protocol data unit is integrity protected;
  decode the portion of data packets based on the configuration information; and
  perform integrity protection verification on the portion of data packets.

17. The second device of claim 15, wherein the at least one processor and the computer program codes configured to cause the second device to determine the configuration information comprises the at least one processor and the computer program codes configured to cause the second device to:
  determine at least one of:
    a sequence number of a protocol data unit, wherein the integrity protection is performed on the portion of the plurality of data packets to be transmitted in the protocol data unit,
    a first timer during which the integrity protection is performed on the portion of data packets,
    a second timer during which at least one integrity protected data packet is performed,
    a third timer during which at least one unprotected data packet is allowed, or
    a fourth timer during which no integrity protection is performed.

18. The second device of claim 15, wherein the at least one processor and the computer program codes are further configured to cause the second device to:
  receive a report indicating a failure of the integrity verification to the second device; or
  receive a request for re-establishment of radio resource control, RRC, connection between the first device and the second device.

* * * * *